(12) United States Patent
Kohyama et al.

(10) Patent No.: US 7,776,464 B2
(45) Date of Patent: Aug. 17, 2010

(54) SOLID POLYMER ELECTROLYTE FUEL CELL AND ELECTRODE STRUCTURE FOR THE FUEL CELL

(75) Inventors: Katsuhiko Kohyama, Saitama (JP); Hiroshi Shinkai, Saitama (JP); Hiroyuki Tanaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 981 days.

(21) Appl. No.: 10/551,349

(22) PCT Filed: Mar. 26, 2004

(86) PCT No.: PCT/JP2004/004264
§ 371 (c)(1), (2), (4) Date: Oct. 10, 2006

(87) PCT Pub. No.: WO2004/088779
PCT Pub. Date: Oct. 14, 2004

(65) Prior Publication Data
US 2007/0042261 A1    Feb. 22, 2007

(30) Foreign Application Priority Data
Mar. 28, 2003  (JP) .............................. 2003-091617

(51) Int. Cl.
H01M 2/00 (2006.01)
H01M 2/02 (2006.01)
H01M 2/08 (2006.01)

(52) U.S. Cl. ............................. 429/35; 429/30; 429/34; 429/36

(58) Field of Classification Search ................... 429/34, 429/35, 30, 36
See application file for complete search history.

(56) References Cited

U.S. PATENT DOCUMENTS 5,264,299 A * 11/1993 Krasij et al. .................. 429/30
6,261,711 B1 * 7/2001 Matlock et al. ............... 429/34

* cited by examiner

*Primary Examiner*—Patrick Ryan
*Assistant Examiner*—Julian Mercado
(74) *Attorney, Agent, or Firm*—Lahive & Cockfield, LLP; Anthony A. Laurentano, Esq.

(57) ABSTRACT

A solid polymer electrolyte fuel cell (2) is formed from an electrode structure (7) and first and second separators (8, 9). The electrode structure (7) has a solid polymer electrolyte membrane (10), first and second electrode layers (11, 12), and first and second diffusion layers (13, 14). The first separator (8) forms a first gas passage ($P_H$) through which a fuel gas (H) flows, and the second separator (9) forms a second gas passage ($P_A$) through which an oxidizing gas (A) flows. A first jutting-out portion (15) of the solid polymer electrolyte membrane (10) and a second jutting-out portion (16) of the second diffusion layer (14) are joined together over the entire peripheries thereof via a cured adhesive layer (17), and the second jutting-out portion (16) is in a state in which it is impregnated by cured adhesive. A seal (27) of the first separator (8) is in intimate contact with the surface of the first jutting-out portion (15), and a seal (21) of the second separator (9) is in intimate contact with the surface of the second jutting-out portion (16). It is therefore possible to eliminate the problem of leaked fuel gas and oxidizing gas reacting with each other around the electrode structure.

12 Claims, 13 Drawing Sheets

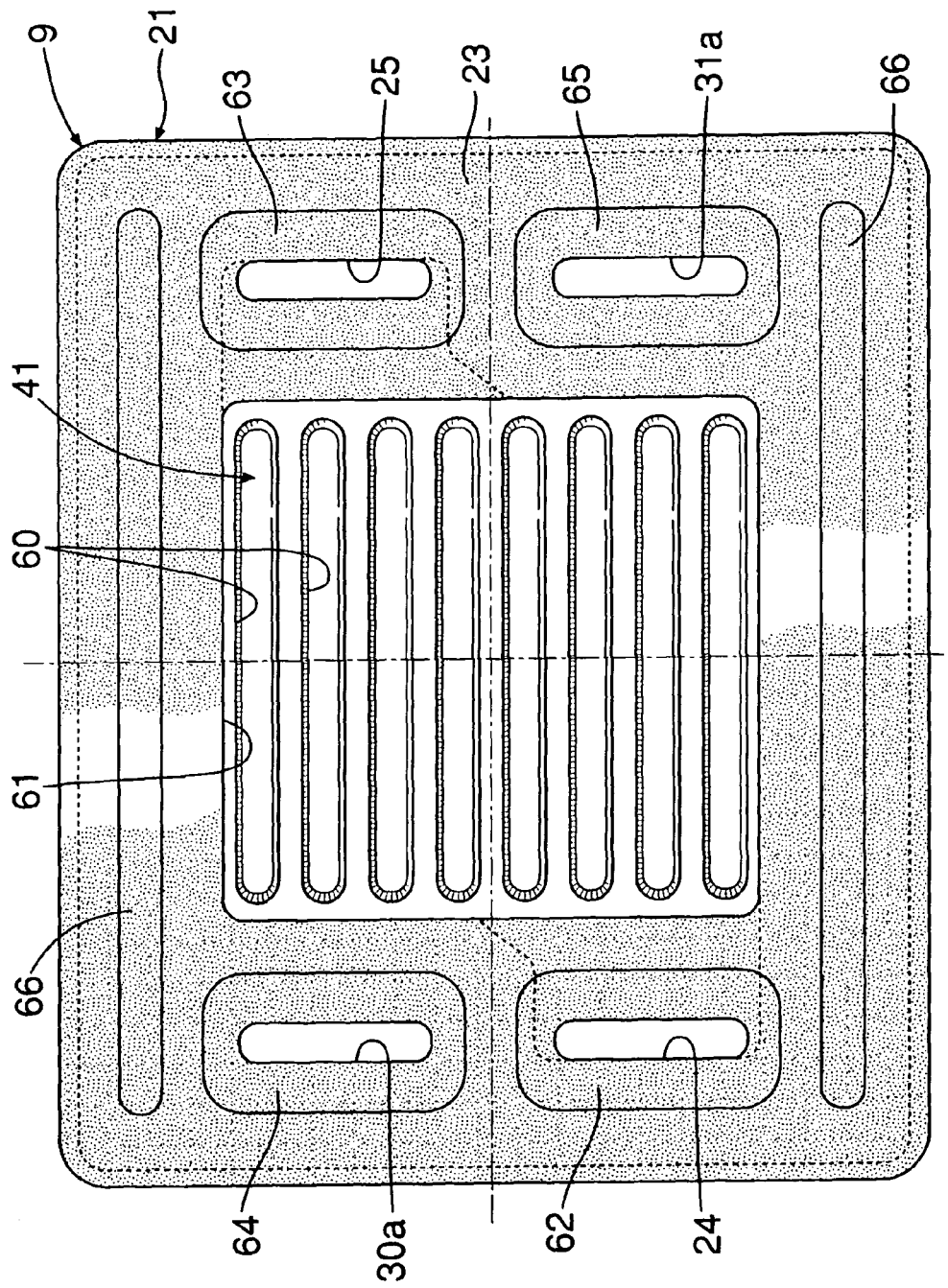

SOLID POLYMER ELECTROLYTE FUEL CELL AND ELECTRODE STRUCTURE FOR THE FUEL CELL

RELATED APPLICATIONS

This application is a 35 U.S.C. 371 national stage filing of International Application No. PCT/JP2004/004264, filed 26 Mar. 2004, which claims priority to Japanese Patent Application No. 2003-91617 filed on 28 Mar. 2003 in Japan. The contents of the aforementioned applications are hereby incorporated by reference.

FIELD OF THE INVENTION

The present invention relates to a solid polymer electrolyte fuel cell and an electrode structure used for the fuel cell.

BACKGROUND ART

A conventionally known solid polymer electrolyte fuel cell is formed from a plate-shaped electrode structure and first and second separators that sandwich the electrode structure. The electrode structure has a solid polymer electrolyte membrane, first and second electrode layers that sandwich the solid polymer electrolyte membrane, and first and second diffusion layers, which are disposed outside the corresponding electrode layers. The first separator forms, in cooperation with a face on the first diffusion layer side of the electrode structure, a first gas passage through which one type of gas among a fuel gas and an oxidizing gas flows, and the second separator forms, in cooperation with a face on the second diffusion layer side of the electrode structure, a second gas passage through which the other type of gas among the fuel gas and the oxidizing gas flows. In this case, the solid polymer electrolyte membrane, the first and second electrode layer, and the first and second diffusion layers are formed so as to have substantially the same dimensions (ref., e.g. U.S. Pat. No. 5,176,966).

However, in accordance with the above-mentioned arrangement, there might be the problem that, since outer edges of the first electrode layer and the first diffusion layer are present in the proximity of outer edges of the second electrode layer and the second diffusion layer with the outer edge of the solid polymer electrolyte membrane held therebetween, if a fuel gas and an oxidizing gas leak from the first electrode layer side and the second electrode layer side, they react with each other around the electrode structure.

DISCLOSURE OF THE INVENTION

It is an object of the present invention to provide the above-mentioned solid polymer electrolyte fuel cell in which the problem of leaked fuel gas and oxidizing gas reacting around the electrode structure can be avoided, and to provide the electrode structure for the fuel cell.

In order to attain this object, in accordance with a first aspect of the present invention, there is provided a solid polymer electrolyte fuel cell comprising: a plate-shaped electrode structure and first and second separators that sandwich the electrode structure; the electrode structure comprising a solid polymer electrolyte membrane; first and second electrode layers that sandwich the solid polymer electrolyte membrane; and first and second diffusion layers that are disposed outside the corresponding electrode layers; the first separator forming, in cooperation with a face on the first diffusion layer side of the electrode structure, a first gas passage, one type of gas among a fuel gas and an oxidizing gas flowing through the first gas passage; and the second separator forming, in cooperation with a face on the second diffusion layer side of the electrode structure, a second gas passage, the other type of gas among the fuel gas and the oxidizing gas flowing through the second gas passage; characterized in that the solid polymer electrolyte membrane is formed so as to have a first jutting-out portion that juts out from peripheries of the first diffusion layer and the first and second electrode layers, the second diffusion layer is formed so as to have a second jutting-out portion that juts out from the periphery of the second electrode layer and faces the first jutting-out portion, the first and second jutting-out portions are joined together over the entire peripheries thereof via a cured adhesive layer, the second jutting-out portion is in a state in which it is impregnated by cured adhesive, part of the surface of the first jutting-out portion is set as an inlet area and an outlet area for the one type of gas, a seal of the first separator is in intimate contact with the surface of the first jutting-out portion apart from the inlet area and the outlet area so as to form the first gas passage, part of the surface of the second jutting-out portion is set as an inlet area and an outlet area for the other type of gas, a seal of the second separator is in intimate contact with the surface of the second jutting-out portion apart from the inlet area and the outlet area so as to form the second gas passage, the second electrode layer surrounded by the cured adhesive layer is separated from the cured adhesive layer, and the outer edge of the second electrode layer is staggered relative to the outer edge of the first electrode layer with the solid polymer electrolyte membrane interposed therebetween.

Whereas the first and second separators and the solid polymer electrolyte membrane are all gas-tight, the first and second diffusion layers and the first and second electrode layers are all gas permeable. Providing the seal for the first separator in intimate contact with the surface of the first jutting-out portion of the solid polymer electrolyte membrane apart from the inlet area and the outlet area thereof enables the first gas passage inside the seal of the first separator to be hermetically sealed against the outside, thereby reliably preventing the one type of gas from leaking. In this case, the first jutting-out portion, the cured adhesive layer, and the second jutting-out portion, which is in the state in which it is impregnated by cured adhesive, are not weakened even by being clamped under pressure between the two seals of the first and second separators, and the hermetically sealed state can therefore be maintained over a long period of time. Therefore, even if the other type of gas leaks past the second jutting-out portion, it will not come into contact with the one type of gas, thus enabling a reaction between leaked fuel gas and oxidizing gas around the electrode structure to be avoided.

In accordance with a second aspect of the present invention, in addition to the first aspect, there is provided a solid polymer electrolyte fuel cell, wherein the second electrode layer surrounded by the cured adhesive layer is separated from the cured adhesive layer, and the outer edge of the second electrode layer is staggered relative to the outer edge of the first electrode layer with the solid polymer electrolyte membrane interposed therebetween.

Stress is concentrated in a portion of the solid polymer electrolyte membrane that abuts against the outer edges of the first and second electrode layers, and if the outer edges of the two electrode layers coincided with each other, cracks occurring on opposite sides of the membrane would join up, thus damaging the membrane, but since the outer edges of the two electrode layers are staggered relative to each other as described above, the above-mentioned problem does not occur.

Furthermore, as described above, since the second electrode layer is separated from the cured adhesive layer, an adhesive component does not permeate the second electrode layer during formation of the cured adhesive layer, and the function of the second electrode layer is not impaired.

In accordance with a third aspect of the present invention, in addition to the first aspect, there is provided a solid polymer electrolyte fuel cell, wherein the first diffusion layer has a third jutting-out portion that juts out from the periphery of the first electrode layer, the third jutting-out portion and the solid polymer electrolyte membrane are joined together over the entire peripheries thereof via a cured adhesive layer, the third jutting-out portion is in a state in which it is impregnated by cured adhesive, the cured adhesive layer and the second jutting-out portion on the second diffusion layer side are formed so as to face the cured adhesive layer on the first diffusion layer side with the solid polymer electrolyte membrane interposed therebetween, one section of a gas passage-forming part of the first separator is in intimate contact with the third jutting-out portion of the first diffusion layer over the entire periphery thereof, one section of a gas passage-forming part of the second separator is in intimate contact with the second jutting-out portion of the second diffusion layer over the entire periphery thereof, and the first electrode layer is separated from the cured adhesive layer surrounding the first electrode layer.

In accordance with the above-mentioned arrangement, it is possible to prevent a sandwiched portion that includes the third jutting-out portion, the adjacent cured adhesive layer, the solid polymer electrolyte membrane, the adjacent cured adhesive layer, and the second jutting-out portion, that is, the portion of the electrode structure that is sandwiched between the two separators, from being weakened, thereby enabling the layered structure of the electrode structure to be maintained over a long period of time.

Moreover, since the first electrode layer is separated from the cured adhesive layer, an adhesive component does not permeate the first electrode layer during formation of the cured adhesive layer, and the function of the first electrode layer is not impaired.

In accordance with a fourth aspect of the present invention, in addition to the first aspect, there is provided a solid polymer electrolyte fuel cell, wherein a portion of the second jutting-out portion that corresponds to at least one area among the inlet areas and the outlet areas is in a state in which it is impregnated by cured adhesive.

In accordance with the above-mentioned arrangement, with regard to the second jutting-out portion, a portion thereof that corresponds to at least one area among the inlet area and the outlet area has its rigidity and strength enhanced effectively by the portion being in the state in which it is impregnated by cured adhesive, thereby preventing effectively the portion from being deformed and blocking or narrowing a gas passage in the corresponding area.

BRIEF DESCRIPTION OF THE DRAWINGS

The drawings illustrate one embodiment of the present invention;

FIG. 14 is a sectional view along line 14-14 in FIG. 3.

BEST MODE FOR CARRYING OUT THE INVENTION

A mode for carrying out the present invention is explained specifically below by reference to an embodiment of the present invention shown in the attached drawings.

Figure 1:
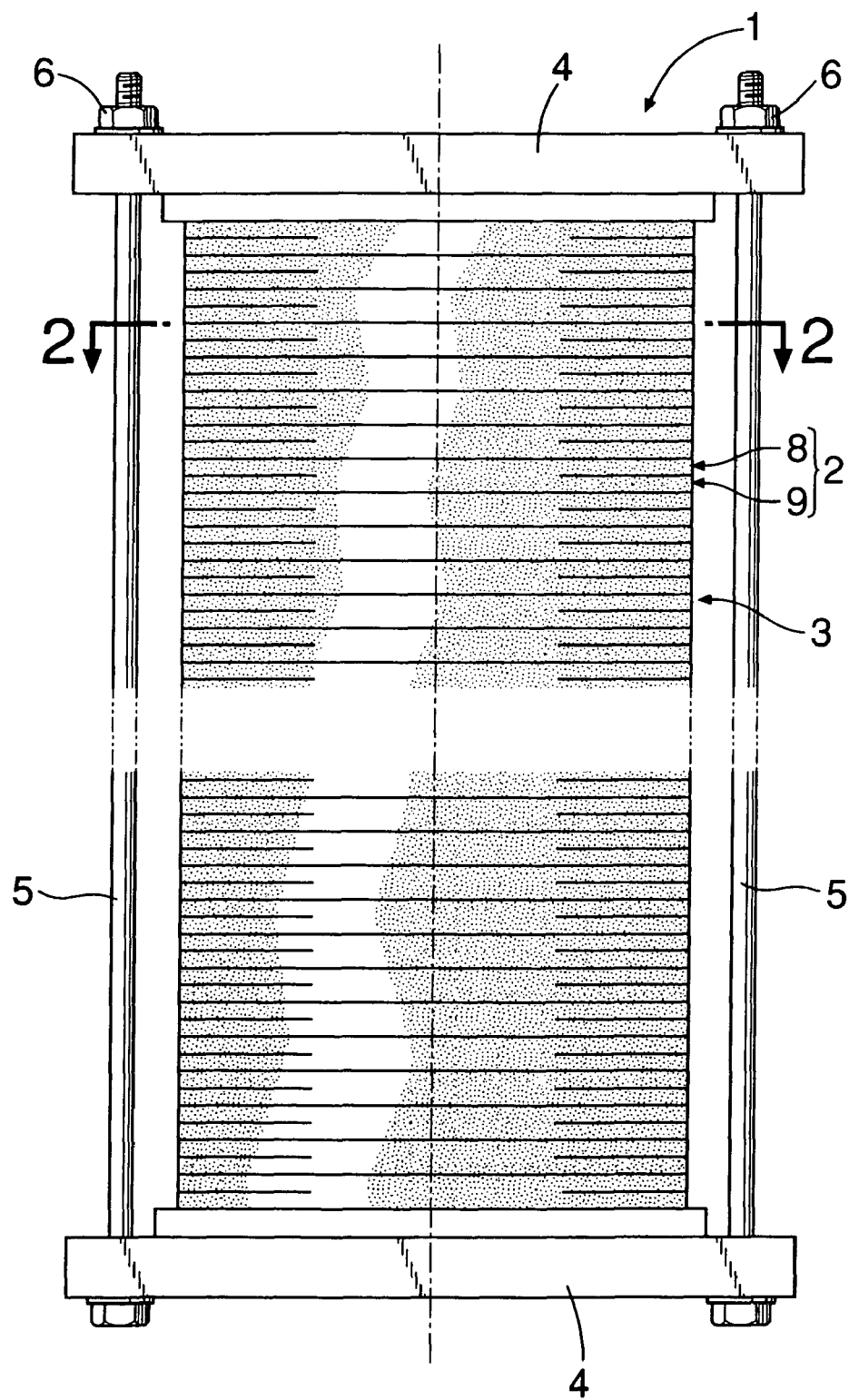
FIG. 1 is a side view of a stack.

Firstly, FIG. 1 shows an outline of a stack 1, the stack 1 having an assembly 3 formed by stacking a plurality of flat rectangular solid polymer electrolyte fuel cells (hereinafter called unit cells) 2, two end plates 4 abutting against opposite ends of the assembly 3, a plurality of bolts 5 inserted through the two end plates 4, and a plurality of nuts 6 screwed around threaded portions of the bolts 5 projecting from the two end plates 4. All of the unit cells 2 have the same structure, and are formed, as shown in FIGS. 2 to 5, from a plate-shaped electrode structure 7, and an upper first separator 8 and a lower second separator 9 that sandwich the electrode structure 7.

Figure 6:
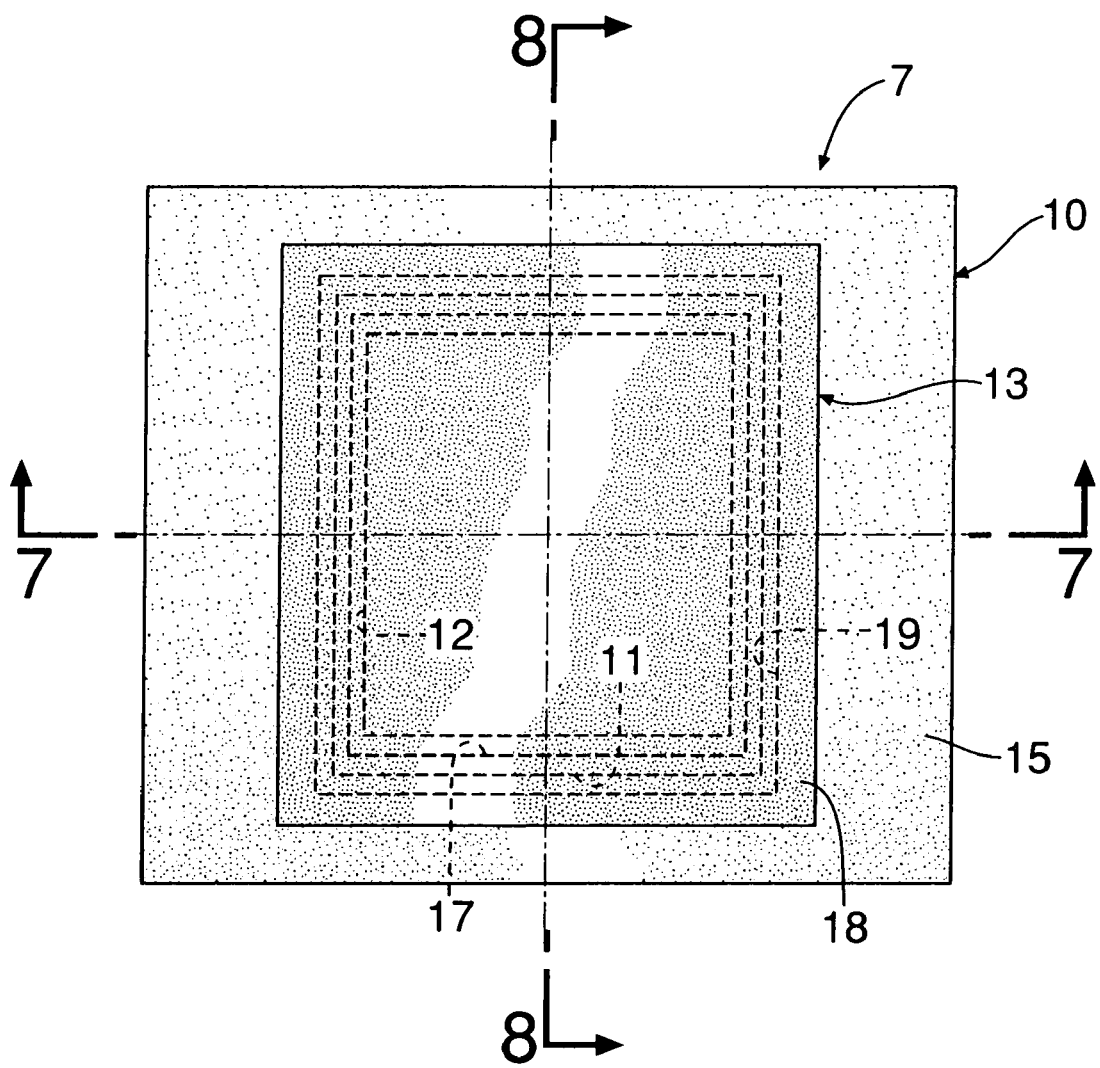
FIG. 6 is a plan view of an electrode structure.
Figure 7:
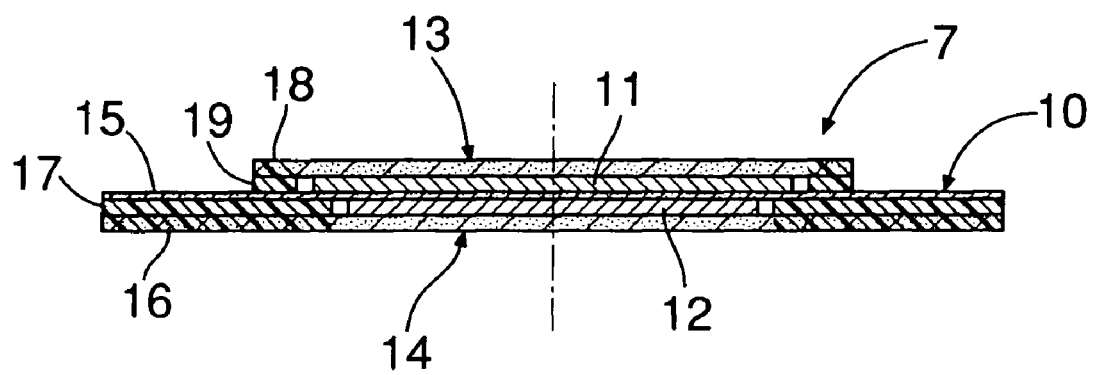
FIG. 7 is a sectional view along line 7-7 in FIG. 6.
Figure 8:
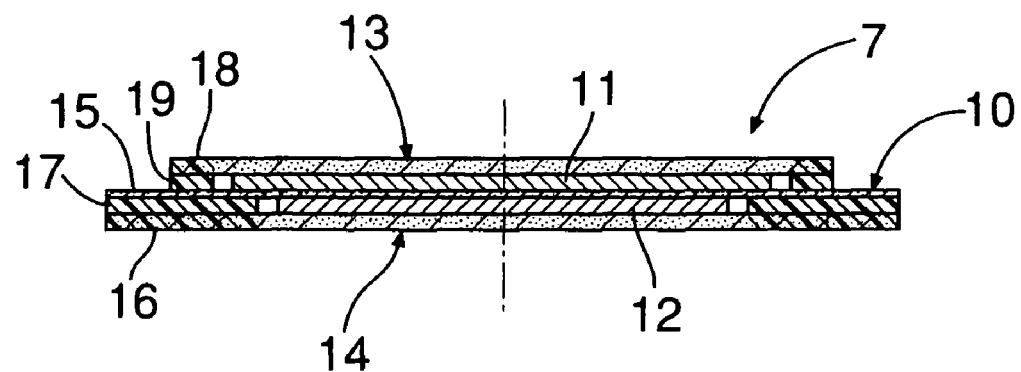
FIG. 8 is a sectional view along line 8-8 in FIG. 6.

As is clearly shown in FIGS. 6 to 8, the electrode structure 7 has a gas-tight solid polymer electrolyte membrane 10, an upper gas permeable first electrode layer 11 and a lower second electrode layer 12 that sandwich the solid polymer electrolyte membrane 10, and an upper gas permeable first diffusion layer 13 and a lower gas permeable second diffusion layer 14 that are disposed outside the corresponding electrode layers 11 and 12. The solid polymer electrolyte membrane 10 is formed from, for example, a sulfonated PEEK (polyether ether ketone), which is an aromatic hydrocarbon-based polymer ion-exchange component. The first electrode layer (for example, an anode) 11 is formed from an aggregate of a Pt—Ru supporting carbon powder and a fluorine resin based ion-exchange component (for example, brand name Nafion) as a binder. The second electrode layer (for example, a cathode) 12 is formed from an aggregate of a Pt supporting carbon powder and a fluorine resin based ion-exchange component (for example, brand name Nafion) as a binder. The first and second diffusion layers 13 and 14 are formed from carbon fiber paper.

The solid polymer electrolyte membrane 10 is formed so as to have a first jutting-out portion 15 that juts out from the peripheries of the first diffusion layer 13 and the first and second electrode layers 11 and 12, and the second diffusion layer 14 is formed so as to have a second jutting-out portion 16 that juts out from the periphery of the second electrode layer 12 and faces the first jutting-out portion 15. These first and second jutting-out portions 15 and 16 are joined together over the entire peripheries thereof via an endless cured adhesive layer 17, and the entire periphery of the second jutting-out portion 16 is in a state in which it is impregnated by cured adhesive. As the adhesive, a fluorine based adhesive (for example, product name TB1116, manufactured by Three Bond Co., Ltd.) is used.

The first diffusion layer 13 has a third jutting-out portion 18 that juts out from the periphery of the first electrode layer 11, the third jutting-out portion 18 and the solid polymer electrolyte membrane 10 are joined together over the entire peripheries thereof via an endless cured adhesive layer 19, which is formed from the same adhesive as above, and the entire periphery of the third jutting-out portion 18 is in a state in which it is impregnated by cured adhesive. The cured adhesive layer 17 and the second jutting-out portion 16 on the second diffusion layer 14 side are formed so as to face the cured adhesive layer 19 on the first diffusion layer 13 side with the solid polymer electrolyte membrane 10 interposed therebetween.

The second electrode layer 12, which is surrounded by one of the cured adhesive layers 17, is separated from the cured adhesive layer 17, and the first electrode layer 11, which is surrounded by the other cured adhesive layer 19, is separated from the cured adhesive layer 19. The area of the first electrode layer 11 is larger than that of the second electrode layer 12, and the outer edge of the first electrode layer 11 is therefore staggered relative to the outer edge of the second electrode layer 12 with the solid polymer electrolyte membrane 10 interposed therebetween.

Figure 9:
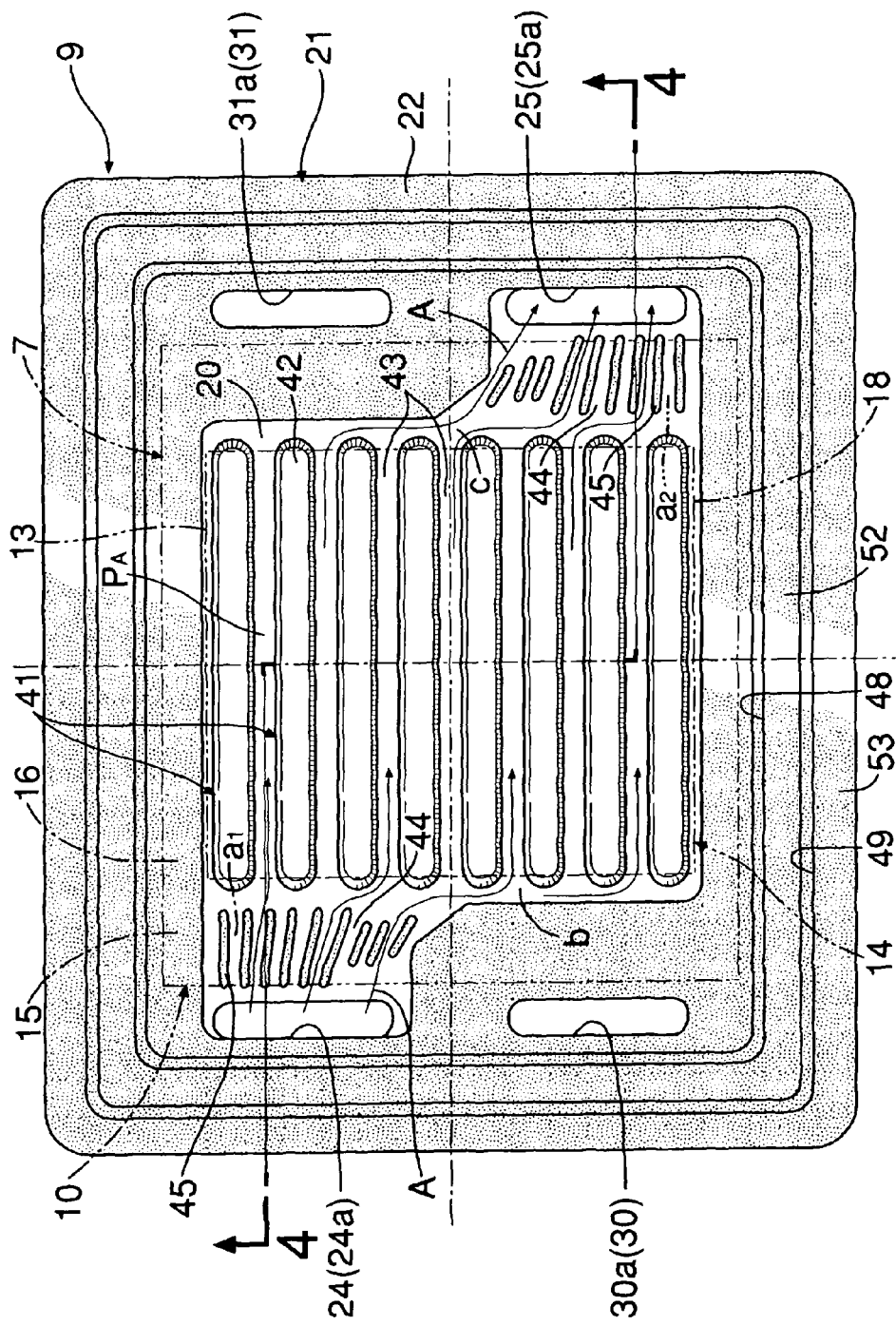
FIG. 9 is a view from arrowed line 9-9 in FIG. 3.

As is clearly shown in FIG. 9, the second separator 9 has a gas passage-forming part 20, which is made of a stainless steel plate, and a seal 21, which is made of ethylene-propylene rubber and is in intimate contact with the peripheral region of the gas passage-forming part 20 so as to cover opposite sides thereof. As shown also in FIGS. 4 and 10, an upper seal-forming part 22 on a side of the seal 21 that faces the electrode structure 7 is in intimate contact with the surface of the second jutting-out portion 16, that is, the outer peripheral region of the downward-facing surface thereof, and on the inner peripheral side of the upper seal-forming part 22 an air passage (second gas passage) $P_A$ is formed between the second diffusion layer 14 and the gas passage-forming part 20, one type of gas among a fuel gas and an oxidizing gas, in this embodiment air (oxygen) A as the oxidizing gas, flowing through the air passage $P_A$. Furthermore, an inlet area $a_1$ and an outlet area $a_2$ for air are set in a section of the downward-facing surface of the second jutting-out portion 16, that is, at diagonal positions, and the upper seal-forming part 22 is not present in these regions $a_1$ and $a_2$. A through hole is formed outside the inlet area $a_1$ so as to penetrate in succession the gas passage-forming part 20 and the lower seal-forming part 23, and the upper opening edge of the through hole is surrounded by the upper seal-forming part 22 apart from the inlet area $a_1$ side. This surrounded space and the through hole form an air inlet hole (gas inlet hole) 24. Moreover, a through hole is formed outside the outlet area $a_2$ so as to penetrate in succession the gas passage-forming part 20 and the lower seal-forming part 23, and the upper opening edge of the through hole is surrounded by the upper seal-forming part 22 apart from the outlet area $a_2$ side. This surrounded space and the through hole form an air outlet hole (gas outlet hole) 25.

Figure 2:
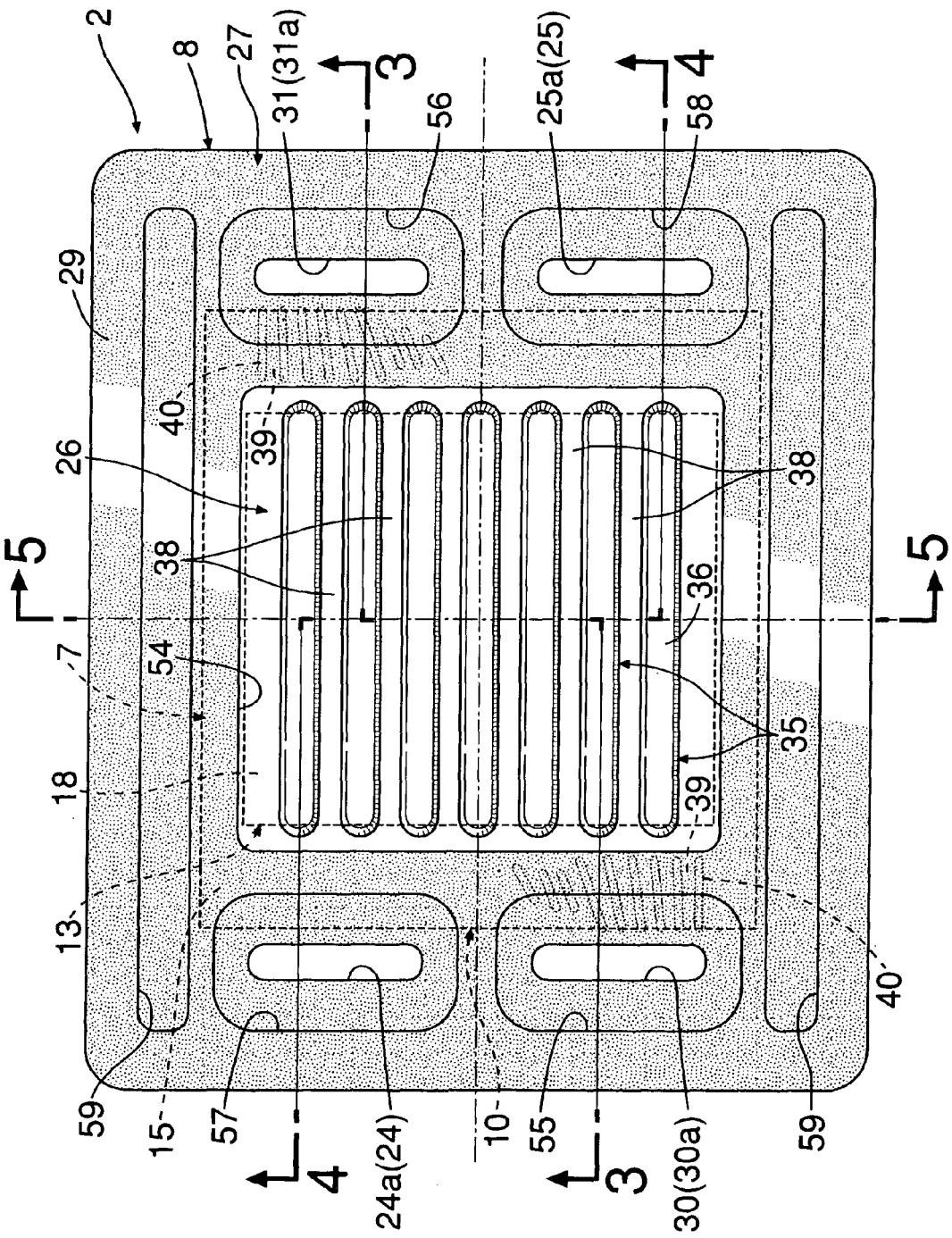
FIG. 2 is a sectional view along line 2-2 in FIG. 1 and corresponds to a view from arrow 2 in FIG. 3.

As is clearly shown in FIG. 2, the first separator 8 has a gas passage-forming part 26, which is formed from a stainless steel plate, and a seal 27, which is formed from ethylene-propylene rubber and is in intimate contact with the peripheral region of the gas passage-forming part 26 so as to cover opposite sides thereof. As shown also in FIGS. 3, 11, and 12, a lower seal-forming part 28 on a side of the seal 27 that faces the electrode structure 7 is in intimate contact with the surface of the first jutting-out portion 15, that is, the outer peripheral region of the upward-facing surface, and on the inner peripheral side of the lower seal-forming part 28 a hydrogen passage (first gas passage) $P_H$ is formed between the gas passage-forming part 26 and the first jutting-out portion 15 and the first diffusion layer 13, the other type of gas among the fuel gas and the oxidizing gas, in this embodiment hydrogen H as the fuel gas, flowing through the hydrogen passage $P_H$. Furthermore, an inlet area $a_3$ and an outlet area $a_4$ for hydrogen are set in a section of the upward-facing surface of the first jutting-out portion 15, that is, at diagonal positions that are in an intersecting relationship with the diagonal positions on the air side, and the lower seal-forming part 28 is not present in these regions $a_3$ and $a_4$. A through hole is formed outside the inlet area $a_3$ so as to penetrate in succession the gas passage-forming part 26 and the upper seal-forming part 29, and the lower opening edge of the through hole is surrounded by the lower seal-forming part 28 apart from the inlet area $a_3$ side. This surrounded space and the through hole form a hydrogen inlet hole (gas inlet hole) 30. Moreover, a through hole is formed outside the outlet area $a_4$ so as to penetrate in succession the gas passage-forming part 26 and the upper seal-forming part 29, and the lower opening edge of the through hole is surrounded by the lower seal-forming part 28 apart from the outlet area $a_4$ side. This surrounded space and the through hole form a hydrogen outlet hole (gas outlet hole) 31.

Figure 3:
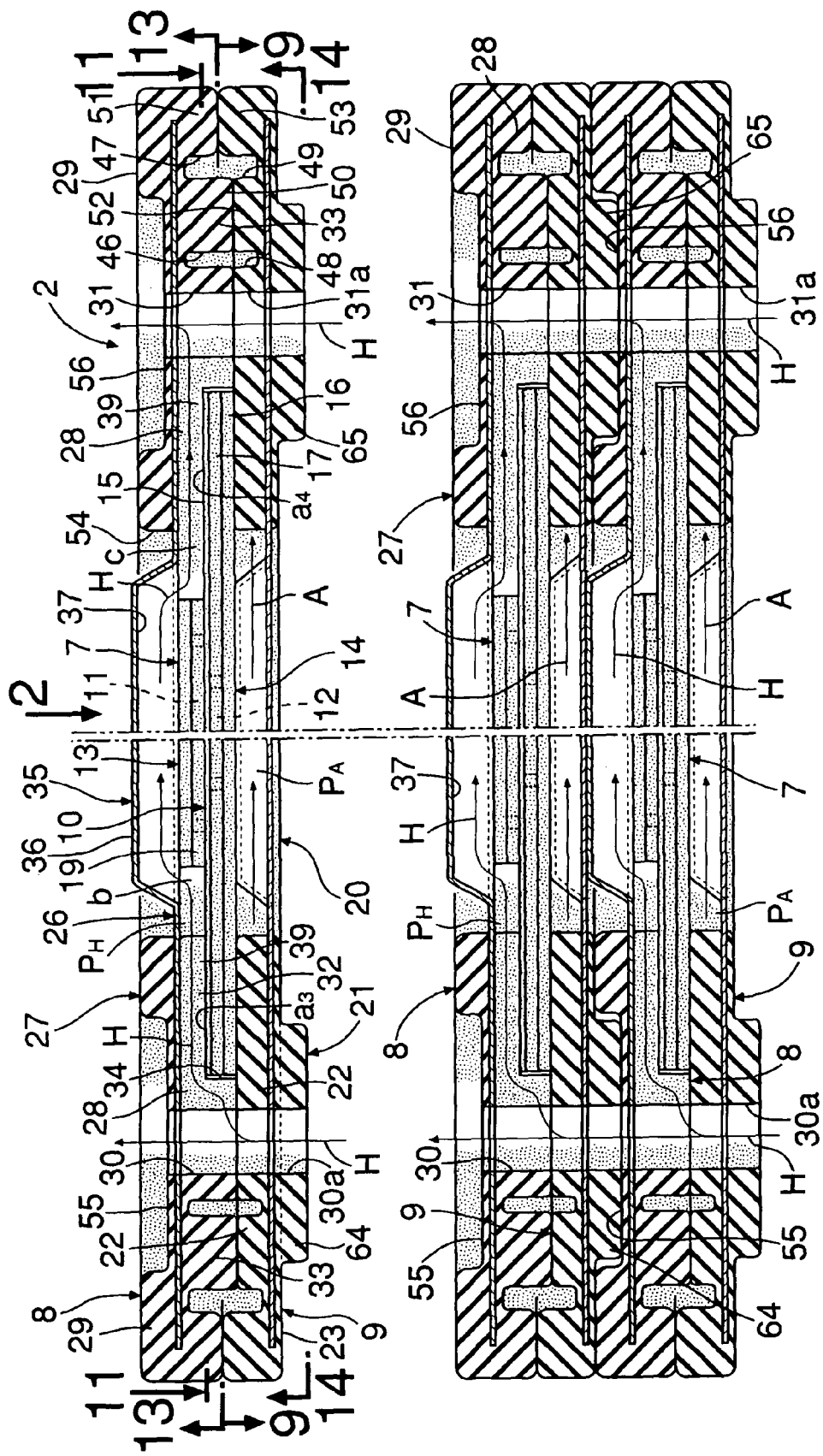
FIG. 3 is a sectional view along line 3-3 in FIG. 2.
Figure 4:
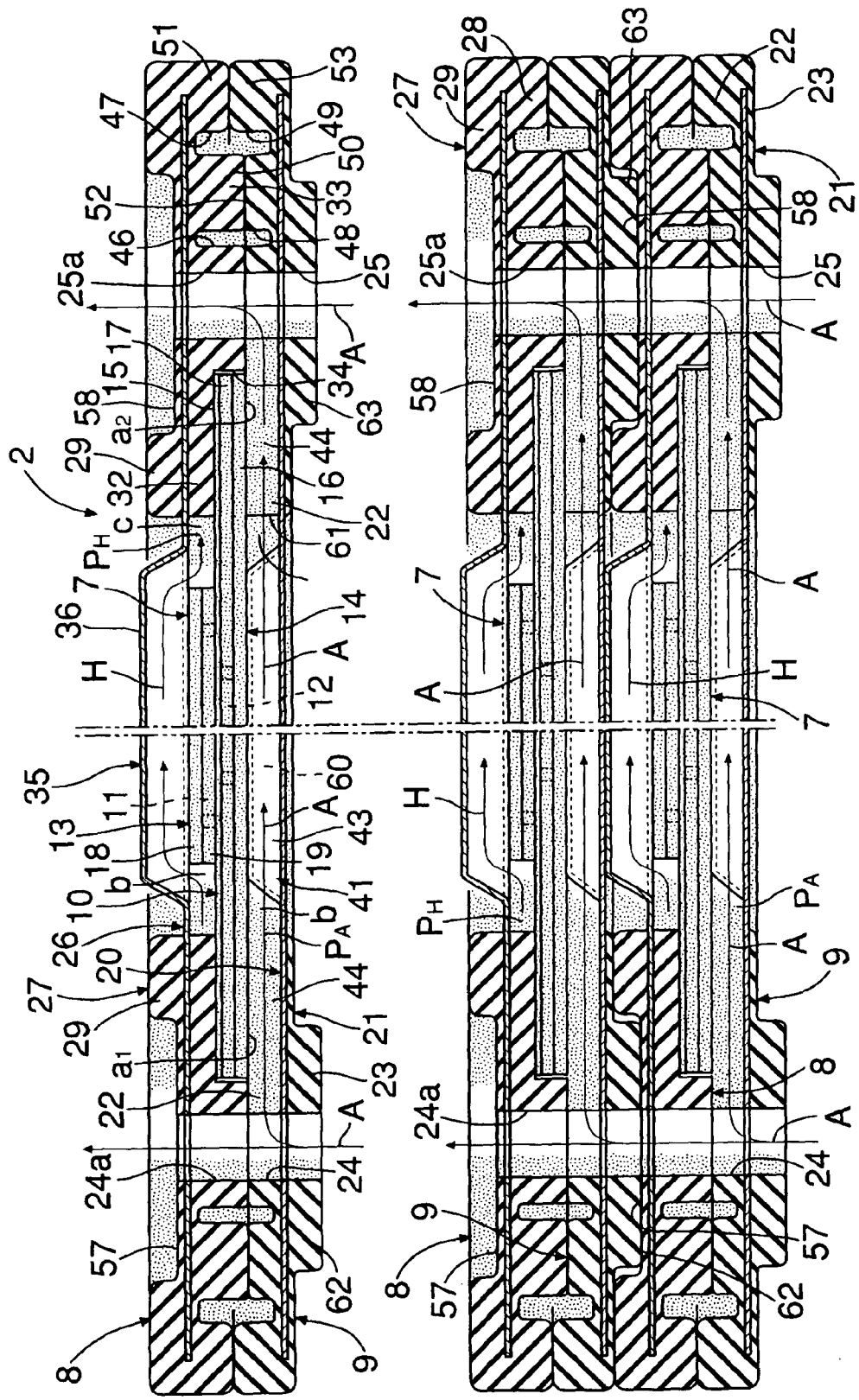
FIG. 4 is a sectional view along line 4-4 in FIG. 2 and corresponds to a sectional view along line 4-4 in FIG. 9.

As shown in FIG. 3, through holes 30a and 31a are formed in the second separator 9 so as to communicate with the hydrogen inlet and outlet holes 30 and 31 respectively of the first separator 8, and as shown in FIG. 4 through holes 24a and 25a are formed in the first separator 8 so as to communicate with the air inlet and outlet holes 24 and 25 respectively of the second separator 9.

Although the hydrogen inlet hole 30 and the hydrogen outlet hole 31 are adjacent to the corresponding through holes 24a and 25a for air, and the air inlet hole 24 and the air outlet hole 25 are adjacent to the corresponding through holes 30a and 31b for hydrogen, these adjacent holes are shielded from each other by the seal 27 of the first separator 8 and the seal 21 of the second separator 9 being in intimate contact with each other. In this case, the lower seal-forming part 28 of the first separator 8 is provided with a step 34 between an inner edge region 32 that is in intimate contact with the surface of the first jutting-out portion 15 and a main region 33 that is in intimate contact with the upper seal-forming part 29 of the second separator 9 in order to accommodate the thickness of a layered portion that includes the first jutting-out portion 15, the cured adhesive layer 17, and the second jutting-out portion 16.

In the above-mentioned structure, the first and second separators 8 and 9 and the solid polymer electrolyte membrane 10 are all gas-tight, whereas the first and second diffusion layers 13 and 14 and the first and second electrode layers 11 and 12 are all gas permeable. Providing the lower seal-forming part 28 of the first separator 8 in intimate contact with the surface of the first jutting-out portion 15 of the solid polymer electrolyte membrane 10 apart from the inlet area $a_3$ and the outlet area $a_4$ enables the hydrogen passage $P_H$ inside the lower seal-forming part 28 of the first separator 8 to be hermetically sealed against the outside, thereby reliably preventing the hydrogen H from leaking. In this case, the first jutting-out portion 15, the cured adhesive layer 17, and the second jutting-out portion 16, which is in a state in which it is impregnated by cured adhesive, are not weakened even by being clamped under pressure between the two seals 21 and 27 of the first and second separators 8 and 9, and the above-mentioned hermetically sealed state can therefore be maintained over a long period of time. Therefore, even if air A leaks past the second jutting-out portion 16, which is gas permeable, it will not come into contact with hydrogen H.

Stress is concentrated in a portion of the solid polymer electrolyte membrane 10 that abuts against the outer edges of the first and second electrode layers 11 and 12, and if the outer edges of the two electrode layers 11 and 12 coincided with each other, cracks occurring on opposite sides of the membrane 10 would join up, thus damaging the membrane 10, but since the outer edges of the two electrode layers 11 and 12 are staggered relative to each other as described above, the above-mentioned problem does not occur.

Furthermore, since the first and second electrode layers 11 and 12 are separated from the corresponding cured adhesive layers 19 and 17, an adhesive component does not permeate the first and second electrode layers 11 and 12 during formation of the cured adhesive layers and the functions of the first and second electrode layers 11 and 12 are not impaired.

As shown in FIGS. 2 to 5, the gas passage-forming part 26 of the first separator 8 extends from a side on which the hydrogen inlet hole 30 and the air inlet hole 24 are present to a side on which the hydrogen outlet hole 31 and the air outlet hole 25 are present, and has a plurality of ridges 35 projecting upward. These ridges 35 have a flat top 36 and are parallel to each other, and there are equal gaps between adjacent ridges. A downward-facing long groove-shaped hollow portion 37 of each of the ridges 35 faces the first diffusion layer 13, and opposite end parts of the long groove-shaped hollow portion 37 jut outside opposite edges of the first diffusion layer 13.

A flat portion 38 that is present on longitudinally opposite sides of each of the ridges 35 is in intimate contact with the surface of the first diffusion layer 13. As a result, sections of the gas passage-forming part 26 of the first separator 8 are in intermittent intimate contact with the third jutting-out portion 18 of the first diffusion layer 13 over the entire periphery thereof (in this case, it may be arranged so that the intimate contact is continuous).

Figure 11:
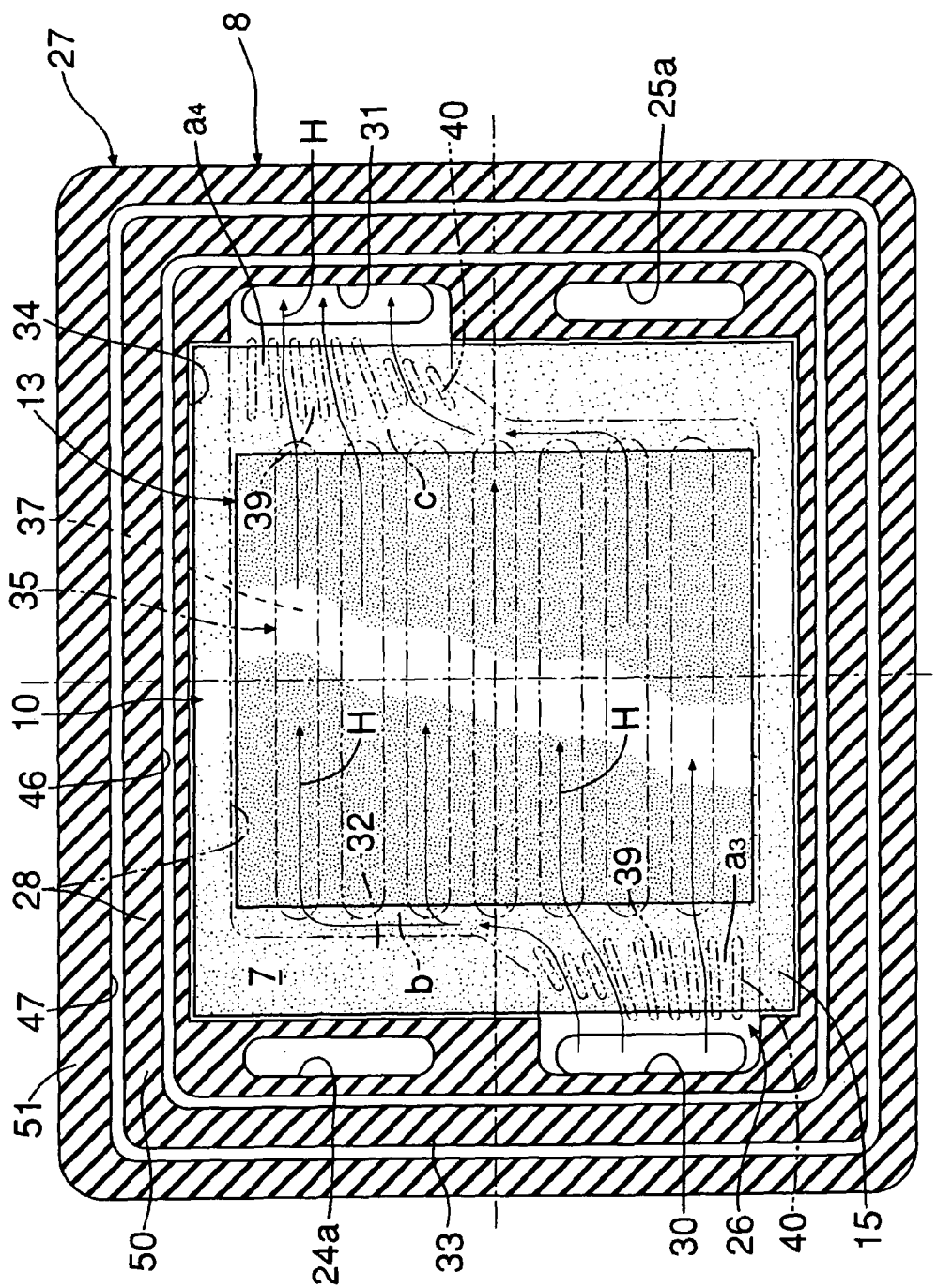
FIG. 11 is a sectional view along line 11-11 in FIG. 3.
Figure 12:
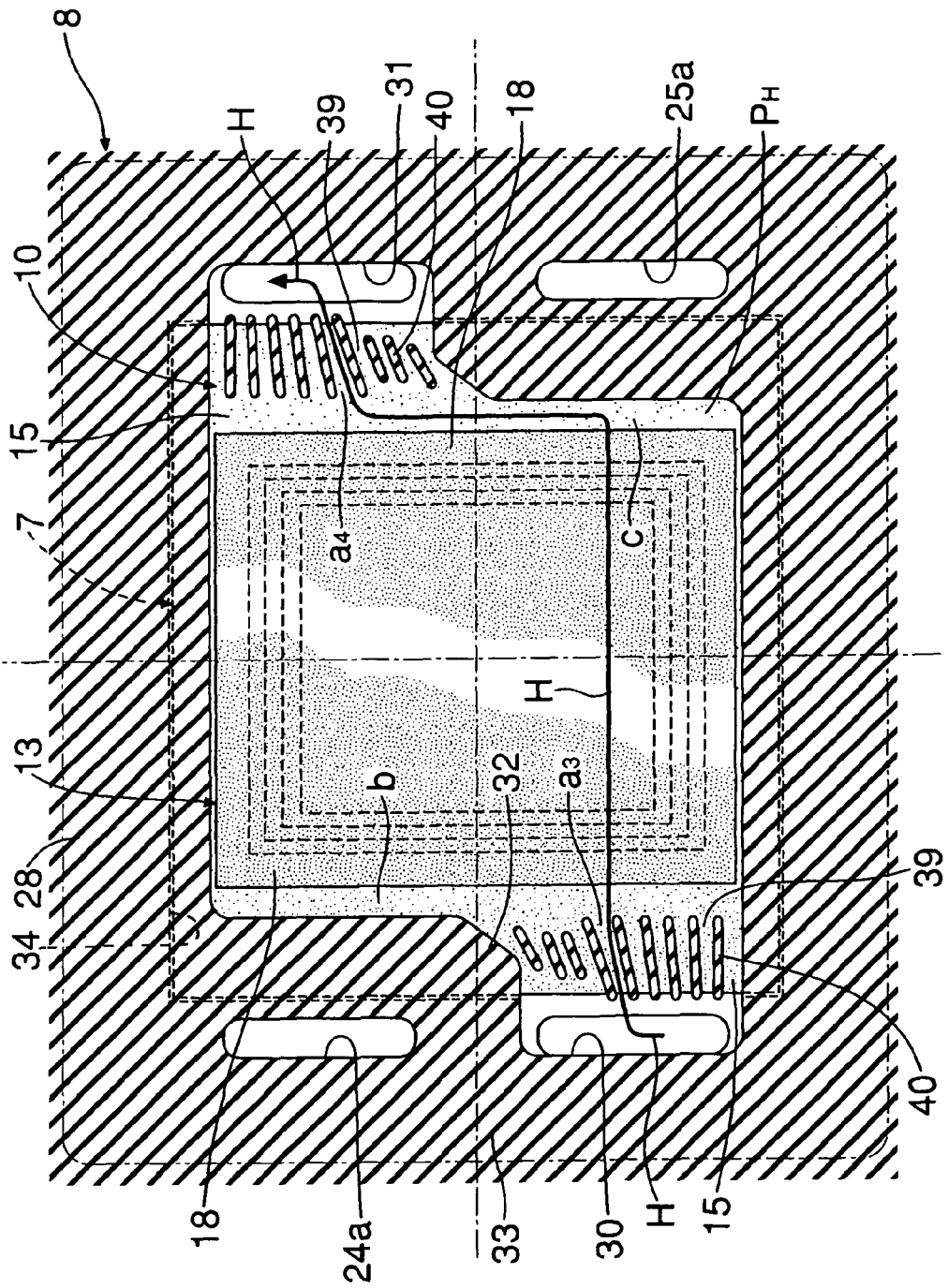
FIG. 12 is a diagram for explaining a state in which hydrogen flows and corresponds to FIG. 11.

As shown in FIGS. 2, 11, and 12, in order to form a plurality of guide passages 39 in each of the inlet area $a_3$ for hydrogen H and the outlet area $a_4$ for hydrogen H, which are present on the surface of the first jutting-out portion 15, the gas passage-forming part 26 is provided with a plurality of small ridges 40, which are formed from ethylene-propylene rubber. Illustration of these small ridges 40 is omitted in FIG. 3. On the side of the surface of the first jutting-out portion 15, an area between the inlet area $a_3$ and the inner edge region 32, and the side of the layered portion that includes the third jutting-out portion 18 and the cured adhesive layer 19 is a dispersion area b in which hydrogen H is dispersed. Furthermore, on the surface of the first jutting-out portion 15, an area between the outlet area $a_4$ and the inner edge region 32, and the side of the layered portion that includes the third jutting-out portion 18 and the cured adhesive layer 19 is a collection area c in which hydrogen H is collected.

In FIGS. 3, 11, and 12, hydrogen H from the hydrogen inlet hole 30 flows via the route: inlet area $a_3$→dispersion area b→long groove-shaped hollow portion 37 of each of the ridges 35→collection area c→outlet area $a_4$→hydrogen outlet hole 31.

As shown in FIGS. 3 to 5, and 9, the gas passage-forming part 20 of the second separator 9 extends from a side on which the hydrogen inlet hole 30 and the air inlet hole 24 are present to a side on which the hydrogen outlet hole 31 and the air outlet hole 25 are present, and has a plurality of ridges 41 projecting upward. These ridges 41 have a flat top 42 and are parallel to each other, and there are equal gaps between adjacent ridges. The ridges 41 each have a length that is equal to the length of ridges 35 of the first separator 8, and the number of ridges 41 is set so as to be one more than the number of ridges 35 of the first separator 8. A long groove 43 between adjacent ridges 41 faces the second diffusion layer 14, and the top 42 of each of the ridges 41 is in intimate contact with the second diffusion layer 14. The long groove 43 and the top 42 of the second separator 9 face the corresponding long groove-shaped hollow portion 37 and flat portion 38 of the first separator 8 with the electrode structure 7 interposed therebe-tween. As a result, sections of the gas passage-forming part 20 of the second separator 9 are in intermittent intimate contact with the second jutting-out portion 16 of the second diffusion layer 14 over the entire periphery thereof (in this case, it may be arranged so that the intimate contact is continuous).

Furthermore, the gas passage-forming part 20 is provided with a plurality of small ridges 45, which are made of ethylene-propylene rubber, in order to form a plurality of guide passages 44 in each of the gas inlet area $a_1$ and the gas outlet area $a_2$ on the surface of the second jutting-out portion 16. Illustration of these small ridges 45 is omitted in FIG. 4. On the side of the surface of the second jutting-out portion 16, an area between the inlet area $a_1$ side and one end side of each of the ridges 41 is a dispersion area b in which air A is dispersed. Furthermore, on the side of the surface of the second jutting-out portion 16, an area between the outlet area $a_2$ side and the other end side of each of the ridges 41 is a collection area c in which air A is collected.

Figure 10:
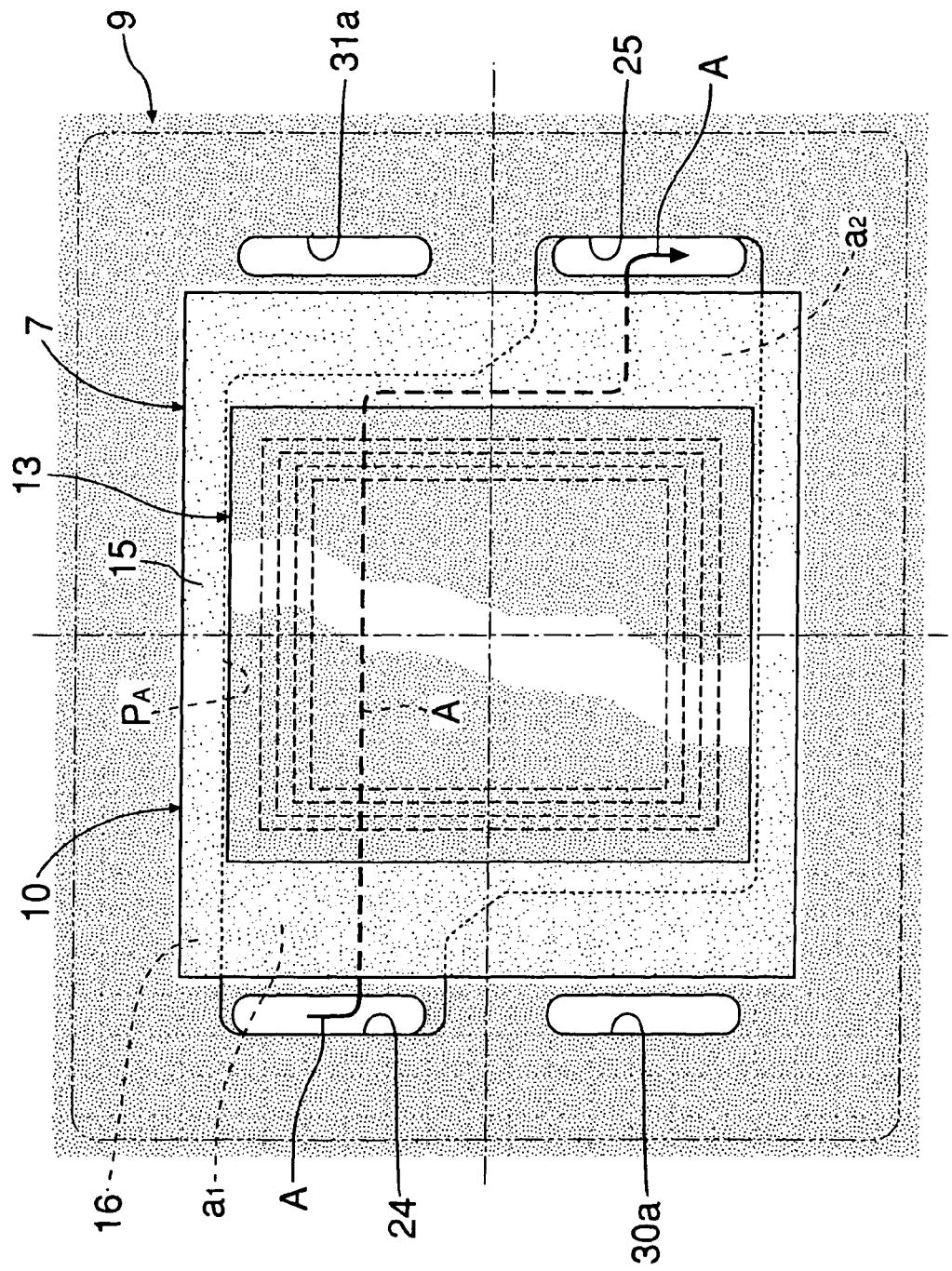
FIG. 10 is a diagram for explaining a state in which air flows and corresponds to FIG. 9.

In FIGS. 4, 9, and 10, air A from the air inlet hole 24 flows via the route: inlet area $a_1$→dispersion area b→each of the long grooves 43→collection area c→outlet area $a_2$→air outlet hole 25.

Figure 5:
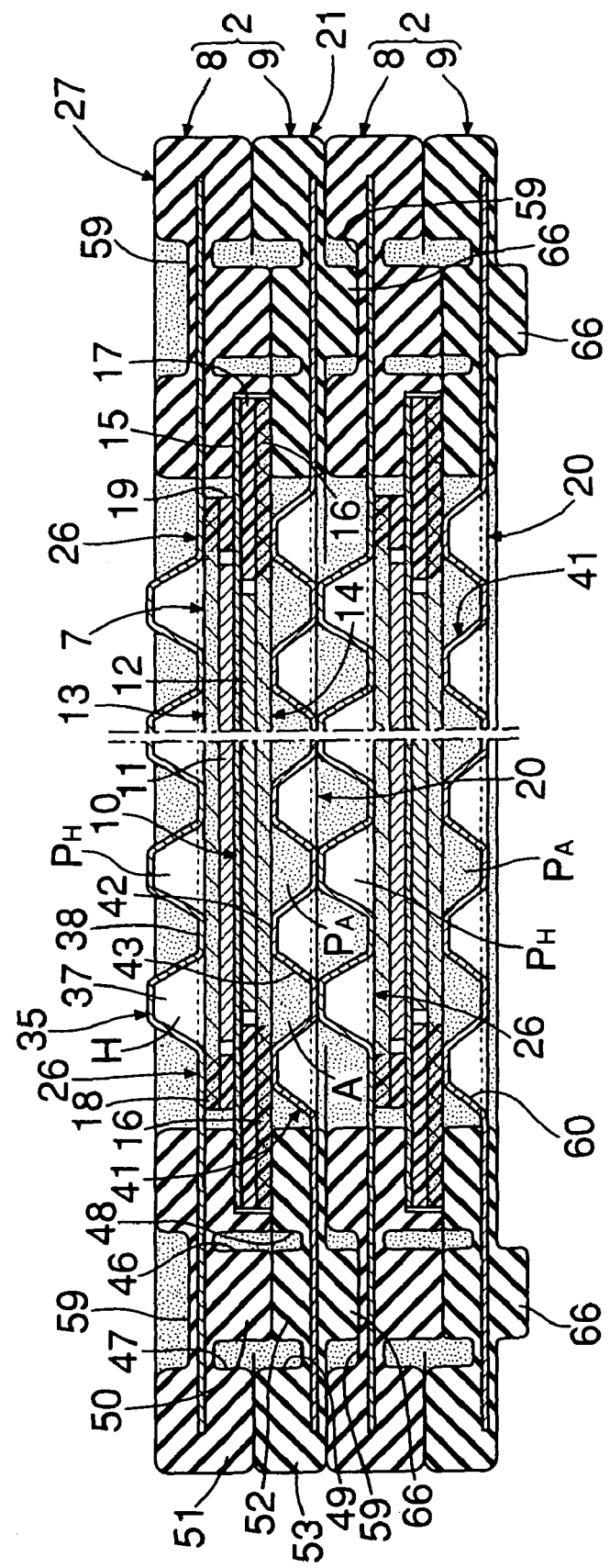
FIG. 5 is a sectional view along line 5-5 in FIG. 2.

In FIG. 5, as described above, by bringing the sections of the gas passage-forming part 26 of the first separator 8 into intermittent intimate contact with the third jutting-out portion 18 of the first diffusion layer 13 over the entire periphery thereof and by bringing the sections of the gas passage-forming part 20 of the second separator 9 into intermittent intimate contact with the second jutting-out portion 16 of the second diffusion layer 14 over the entire periphery thereof, it is possible to prevent a sandwiched portion that includes the third jutting-out portion 18, the adjacent cured adhesive layer 19, the solid polymer electrolyte membrane 10, the adjacent cured adhesive layer 17, and the second jutting-out portion 16, that is, the portion of the electrode structure 7 that is sandwiched between the two separators 8 and 9 from being weakened, thereby enabling the layered structure of the electrode structure 7 to be maintained over a long period of time.

Figure 13:
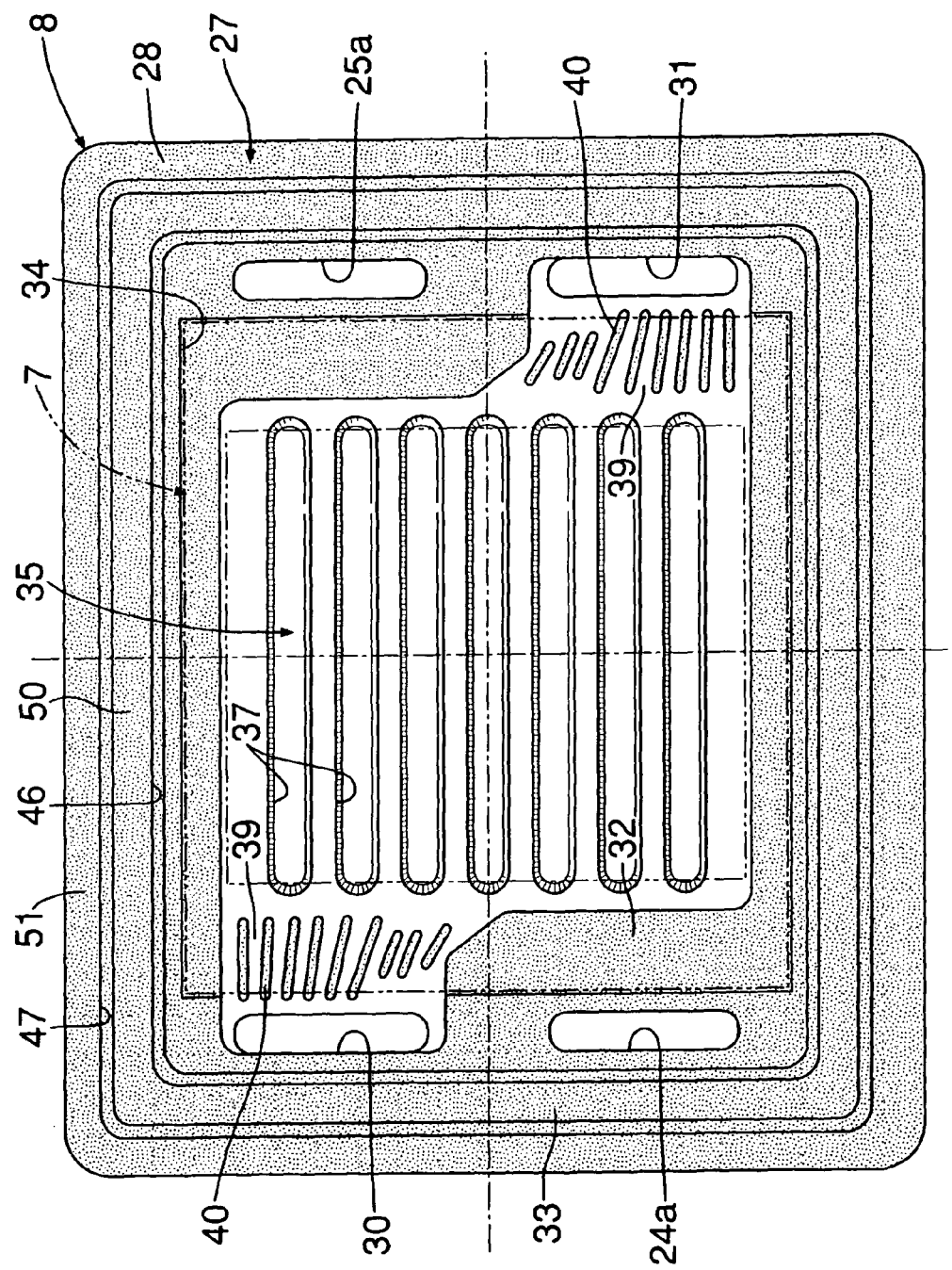
FIG. 13 is a sectional view along line 13-13 in FIG. 3.

As shown in FIG. 13, in the main region 33 of the lower seal-forming part 28 of the seal 27 of the first separator 8, there are an endless inside groove 46 positioned outside the hydrogen inlet hole 30, the hydrogen outlet hole 31, and the two through holes 24a and 25a, and an endless outside groove 47 positioned outside the endless inside groove 46, whereas as shown in FIG. 9, in the upper seal-forming part 22 of the seal 21 of the second separator 9, there are an endless inside groove 48 positioned outside the air inlet hole 24, the air outlet hole 25, and the two through holes 30a and 31a, and an endless outside groove 49 positioned outside the endless inside groove 48, and as shown in FIGS. 3 to 5, an inside land 50 between the inside and outside grooves 46 and 47 of the first separator 8 and an outside land 51 surrounding the outside groove 47 are in intimate contact respectively with an inside land 52 between the inside and outside grooves 48 and 49 of the second separator 9 and an outside land 53 surrounding the outside groove 49.

As shown in FIGS. 2 to 5, in the seal 27 of the first separator 8, the upper seal-forming part 29 has a window 54 through which the plurality of ridges 35 and the area therearound are exposed, a recess 55 having the hydrogen inlet hole 30 opening on a base thereof, a recess 56 having the hydrogen outlet hole 31 opening on a base thereof, recesses 57 and 58 having the through holes 24a and 25a opening on bases thereof respectively, and a pair of long grooves 59 that are present on two sides intersecting two sides where the recesses 55 and 57; 56 and 58 are present and that extend parallel to the ridges 35.

As shown in FIGS. 3 to 5, and 14, in the seal 21 of the second separator 9, the lower seal-forming part 23 has a window 61 through which a plurality of downward-facing long groove-shaped hollow portions 60 and the area therearound are exposed, the plurality of downward-facing long groove-shaped hollow portions 60 corresponding to the plurality of ridges 41, projections 62 having the air inlet hole 24 opening on a lower end face thereof, projections 63 having the air outlet hole 25 opening on a lower end face thereof, projections 64 and 65 having the through holes 30a and 31a opening on lower end faces thereof respectively, and a pair of solid ridges 66 that are present on two sides intersecting two sides where the projections 62 and 64; 63 and 65 are present and extend parallel to the long groove-shaped hollow portions 60.

As shown in FIGS. 3 to 5, inserted into the four recesses 55, 56, 57, and 58 and the two long grooves 59 of the first separator 8 respectively are the four projections 64, 65, 62, and 63 and the two solid ridges 66 of the second separator 9, which is positioned above the first separator 8; at least open edges of the recesses 55, 56, 57, and 58 are in intimate contact with the base edges of the projections 64, 65, 62, and 63, and at least an open edge of each of the long grooves 59 is in intimate contact with the base edge of the corresponding solid ridge 66.

The invention claimed is:

1. A solid polymer electrolyte fuel cell comprising: a plate-shaped electrode structure (7); and first and second separators (8, 9) that sandwich the electrode structure (7); the electrode structure (7) comprising a solid polymer electrolyte membrane (10); first and second electrode layers (11, 12) that sandwich the solid polymer electrolyte membrane (10); and first and second diffusion layers (13, 14) that are disposed outside the corresponding electrode layers (11, 12); the first separator (8) forming, in cooperation with a face on the first diffusion layer (13) side of the electrode structure (7), a first gas passage ($P_H$), one type of gas (H) among a fuel gas (H) and an oxidizing gas (A) flowing through the first gas passage ($P_H$); and the second separator (9) forming, in cooperation with a face on the second diffusion layer (14) side of the electrode structure (7), a second gas passage ($P_A$), the other type of gas (A) among the fuel gas (H) and the oxidizing gas (A) flowing through the second gas passage ($P_A$);

characterized in that the solid polymer electrolyte membrane (10) is formed so as to have a first jutting-out portion (15) that juts out from peripheries of the first diffusion layer (13) and the first and second electrode layers (11, 12), the second diffusion layer (14) is formed so as to have a second jutting-out portion (16) that juts out from a periphery of the second electrode layer (12) and faces the first jutting-out portion (15), the first and second jutting-out portions (15, 16) each having a periphery and being joined together over the entirety of their peripheries via a cured adhesive layer (17), the second jutting-out portion (16) is in a state in which it is impregnated by cured adhesive, part of the surface of the first jutting-out portion (15) is set as an inlet area ($a_3$) and an outlet area ($a_4$) for said one type of gas (H), a seal (27) of the first separator (8) is in intimate contact with the surface of the first jutting-out portion (15) apart from the inlet area ($a_3$) and the outlet area ($a_4$) so as to form the first gas passage ($P_H$), part of the surface of the second jutting-out portion (16) is set as an inlet area ($a_1$) and an outlet area ($a_2$) for said other type of gas (A), and a seal (21) of the second separator (9) is in intimate contact with the surface of the second jutting-out portion (16) apart from the inlet area ($a_1$) and the outlet area ($a_2$) so as to form the second gas passage ($P_A$), the second electrode layer (12) surrounded by the cured adhesive layer (17) is separated from the cured adhesive layer (17), and an outer edge of the second electrode layer (12) is staggered relative to an outer edge of the first electrode layer (11) with the solid polymer electrolyte membrane (10) interposed therebetween.

2. A solid polymer electrolyte fuel cell comprising: a plate-shaped electrode structure (7); and first and second separators (8, 9) that sandwich the electrode structure (7); the electrode structure (7) comprising a solid polymer electrolyte membrane (10); first and second electrode layers (11, 12) that sandwich the solid polymer electrolyte membrane (10); and first and second diffusion layers (13, 14) that are disposed outside the corresponding electrode layers (11, 12); the first separator (8) forming, in cooperation with a face on the first diffusion layer (13) side of the electrode structure (7), a first gas passage ($P_H$), one type of gas (H) among a fuel gas (H) and an oxidizing gas (A) flowing through the first gas passage ($P_H$); and the second separator (9) forming, in cooperation with a face on the second diffusion layer (14) side of the electrode structure (7), a second gas passage ($P_A$), the other type of gas (A) among the fuel gas (H) and the oxidizing gas (A) flowing through the second gas passage ($P_A$);

characterized in that the solid polymer electrolyte membrane (10) is formed so as to have a first jutting-out portion (15) that juts out from peripheries of the first diffusion layer (13) and the first and second electrode layers (11, 12), the second diffusion layer (14) is formed so as to have a second jutting-out portion (16) that juts out from a periphery of the second electrode layer (12) and faces the first jutting-out portion (15), the first and second jutting-out portions (15, 16) each having a periphery and being joined together over the entirety of their peripheries via a cured adhesive layer (17), the second jutting-out portion (16) is in a state in which it is impregnated by cured adhesive, part of the surface of the first jutting-out portion (15) is set as an inlet area ($a_3$) and an outlet area ($a_4$) for said one type of gas (H), a seal (27) of the first separator (8) is in intimate contact with the surface of the first jutting-out portion (15) apart from the inlet area ($a_3$) and the outlet area ($a_4$) so as to form the first gas passage ($P_H$), part of the surface of the second jutting-out portion (16) is set as an inlet area ($a_1$) and an outlet area ($a_2$) for said other type of gas (A), and a seal (21) of the second separator (9) is in intimate contact with the surface of the second jutting-out portion (16) apart from the inlet area ($a_1$) and the outlet area ($a_2$) so as to form the second gas passage ($P_A$).

3. The solid polymer electrolyte fuel cell according to claim 2, wherein the second electrode layer (12) surrounded by the cured adhesive layer (17) is separated from the cured adhesive layer (17), and an outer edge of the second electrode layer (12) is staggered relative to an outer edge of the first electrode layer (11) with the solid polymer electrolyte membrane (10) interposed therebetween.

4. The solid polymer electrolyte fuel cell according to claim 2, wherein the first diffusion layer (13) has a third jutting-out portion (18) that juts out from a periphery of the first electrode layer (11), the third jutting-out portion (18) and the solid polymer electrolyte membrane (10) each having a periphery and being joined together over the entirety of their peripheries via a cured adhesive layer (19), the third jutting-out portion (18) is in a state in which it is impregnated by cured adhesive, the cured adhesive layer (17) and the second jutting-out portion (16) on the second diffusion layer (14) side are formed so as to face the cured adhesive layer (19) on the first diffusion layer (13) side with the solid polymer electrolyte membrane (10) interposed therebetween, one section of a gas passage-forming part (26) of the first separator (8) is in intimate contact with the third jutting-out portion (18) of the first diffusion layer (13) over the entire periphery thereof, one section of a gas passage-forming part (20) of the second separator (9) is in intimate contact with the second jutting-out portion (16) of the second diffusion layer (14) over the entire periphery thereof, and the first electrode layer (11) is separated from the cured adhesive layer (19) surrounding the first electrode layer (11).

5. The solid polymer electrolyte fuel cell according to any one of claims 1 to 4, wherein a portion of the second jutting-out portion (16) that corresponds to at least one area (a$_1$ to a$_4$) among the inlet areas (a$_1$, a$_3$) and the outlet areas (a$_2$, a$_4$) is in a state in which it is impregnated by cured adhesive.

6. The solid polymer electrolyte fuel cell according to any one of claims 1 to 4, wherein the entire periphery of the second jutting-out portion (16) is in a state in which it is impregnated by cured adhesive.

7. A solid polymer electrolyte fuel cell electrode structure (7) comprising: a solid polymer electrolyte membrane (10); first and second electrode layers (11, 12), each having a periphery, that sandwich the solid polymer electrolyte membrane (10); and first and second diffusion layers (13, 14), each having a periphery, that are disposed outside the corresponding electrode layers (11, 12);

the solid polymer electrolyte membrane (10) having a first jutting-out portion (15) that juts out from the peripheries of the first diffusion layer (13) and the first electrode layer (11); and the second diffusion layer (14) having a second jutting-out portion (16) that juts out from the periphery of the second electrode layer (12) and faces the first jutting-out portion (15), at least one portion of the second jutting-out portion (16) being in a state in which it is impregnated by cured adhesive.

8. The solid polymer electrolyte fuel cell electrode structure according to claim 7, wherein the first and second jutting-out portions (15, 16) are joined together via a cured adhesive layer (17).

9. The solid polymer electrolyte fuel cell electrode structure according to claim 7, wherein a portion of the second jutting-out portion (16) that corresponds to at least one area (a$_1$ to a$_4$) among inlet areas (a$_1$, a$_3$) and outlet areas (a$_2$, a$_4$) for a fuel gas (H) and an oxidizing gas (A) is in a state in which it is impregnated by cured adhesive.

10. The solid polymer electrolyte fuel cell electrode structure according to claim 7, wherein the entire periphery of the second jutting-out portion (16) is in a state in which it is impregnated by cured adhesive.

11. The solid polymer electrolyte fuel cell electrode structure according to any one of claims 7 to 10, wherein the second electrode layer (12) surrounded by the cured adhesive layer (17) is separated from the cured adhesive layer (17), and the outer edge of the second electrode layer (12) is staggered relative to the outer edge of the first electrode layer (11) with the solid polymer electrolyte membrane (10) interposed therebetween.

12. The solid polymer electrolyte fuel cell electrode structure according to any one of claims 7 to 10, wherein the first diffusion layer (13) has a third jutting-out portion (18) that juts out from the periphery of the first electrode layer (11), the third jutting-out portion (18) and the solid polymer electrolyte membrane (10) are joined together over the entire peripheries thereof via a cured adhesive layer (19), the third jutting-out portion (18) is in a state in which it is impregnated by cured adhesive, the cured adhesive layer (17) and the second jutting-out portion (16) on the second diffusion layer (14) side are formed so as to face the cured adhesive layer (19) on the first diffusion layer (13) side with the solid polymer electrolyte membrane (10) interposed therebetween, one section of a gas passage-forming part (26) of a first separator (8) is in intimate contact with the third jutting-out portion (18) of the first diffusion layer (13) over the entire periphery thereof, one section of a gas passage-forming part (20) of a second separator (9) is in intimate contact with the second jutting-out portion (16) of the second diffusion layer (14) over the entire periphery thereof, and the first electrode layer (11) is separated from the cured adhesive layer (19) surrounding the first electrode layer (11).

\* \* \* \* \*